H. O. DAY.
TRANSMITTING TRACTION WHEEL.
APPLICATION FILED JULY 8, 1918.
1,372,866.
Patented Mar. 29, 1921.
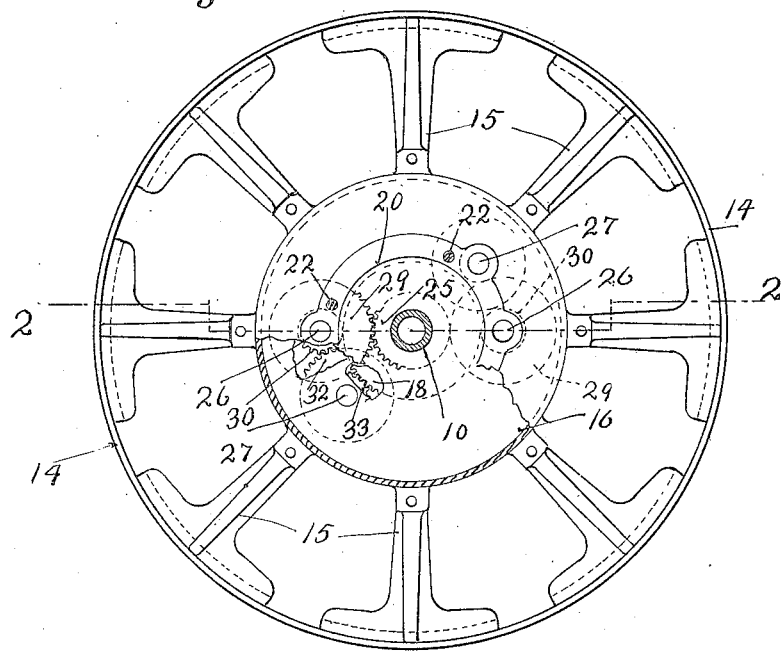
Fig. 1.
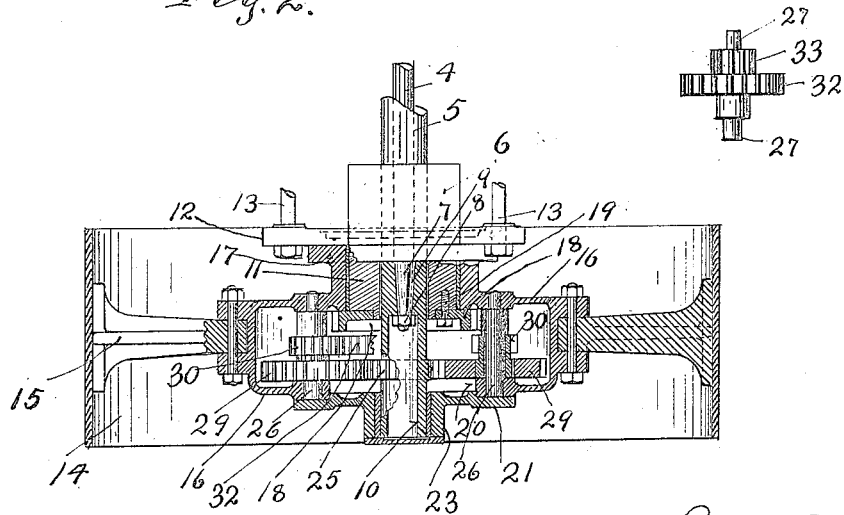
Fig. 2.
Fig. 3.
Witnesses.
A. H. Opsahl
E. E. Wells
Inventor.
H. O. Day
By his Attorneys
Williamson Merchant

UNITED STATES PATENT OFFICE.

HERBERT O. DAY, OF ST. PAUL, MINNESOTA, ASSIGNOR, BY MESNE ASSIGNMENTS, TO CONVERTIBLE TRACTOR CORPORATION, OF ST. PAUL, MINNESOTA, A CORPORATION OF SOUTH DAKOTA.

TRANSMITTING TRACTION-WHEEL.

1,372,866.

Specification of Letters Patent.  Patented Mar. 29, 1921.

Application filed July 8, 1918.  Serial No. 243,793.

*To all whom it may concern:*

Be it known that I, HERBERT O. DAY, citizen of the United States, residing at St. Paul, in the county of Ramsey and State of Minnesota, have invented certain new and useful Improvements in Transmitting Traction-Wheels; and I do hereby declare the following to be a full, clear, and exact description of the invention, such as will enable others skilled in the art to which it appertains to make and use the same.

My present invention is directed to the improvement of that type of transmission traction wheel wherein the power increasing and speed reducing mechanism is incorporated in the wheel structure.

Traction wheels of this character are adapted, for example, to be applied to the rear axle of Ford automobiles or of any of the standard automobiles, but may also be applied to the driving axles of heavier motor propelled vehicles, such as auto trucks. In motor propelled vehicles of the above character, the traction wheels are, as is well known, directly secured to the outer ends of the axle and are driven through differential gears.

When the speed reducing and power increasing traction wheels are substituted on such vehicles for the customary traction wheels, they must, of course, be driven in the same direction as the axles, but at relatively low speed. My present invention is directed, particularly, to an improvement in the internal gear mechanism of the traction wheel whereby a very greatly reduced speed and correspondingly increased power is transmitted from the axle to the traction wheel while driving the traction wheel in the same direction as the axle.

The preferred form of the improved wheel is illustrated in the accompanying drawings wherein like characters indicate like parts throughout the several views.

Referring to the drawings:

Figure 1 is a view in side elevation with some parts broken away and some parts sectioned;

Fig. 2 is a horizontal section taken approximately on the irregular line 2—2 of Fig. 1, some parts being left in full; and Fig. 3 is a detail in plan of one of the reducing gears.

The numeral 4 indicates the customary axle of the motor propelled vehicle, the same being contained within an axle casing 5 and journaled in the customary bearings 6, which latter are rigidly secured in the customary or suitable way to the vehicle frame not shown. The axle 4 has tapered end portions 7 that terminate in threaded trunnions equipped with nuts 8. The customary vehicle traction wheels, not shown, are securable on the tapered axle ends 7 by means of the nuts 8 and usually by coöperating means, such as keys 9.

In this improved wheel, as in the wheel of the application above identified, tubular axle extensions 10, at their inner ends are snugly fitted onto the tapered axle ends 7 and are rigidly, but detachably secured thereto by the coöperative nuts 8 and keys 9. The bore in the outer portions of the axle extensions 10 are large enough to permit the engagement of the nuts 8 by a suitable socket wrench.

Non-rotary bearing sleeves 11 are telescoped around but spaced concentrically from the respective axle extensions 10, and these bearing sleeves, as shown, are provided with base flanges 12, which by suitable rods 13 are anchored to the machine frame both against lateral and rotary movements.

The transmitting traction wheels as preferably constructed and separately described are as follows:

Such traction wheel comprises a suitable rim 14, suitable spokes 15 and a centrally located combined hub and gear case structure 16, which latter, as shown, is bolted to the spokes. The inner wall of the casing 16 is formed with a bearing sleeve or hub 17 that rotates on the non-rotary bearing sleeve 11, and is held against lateral displacement by a non-rotary spur gear 18 (see Fig. 2). This gear 18 is of larger diameter than the sleeve 11, is fitted snugly onto the reduced outer end thereof and is rigidly but detachably clamped and anchored to said sleeve preferably by cap screws 19, passed through perforations in the web side gear and screwed into said sleeve.

In its outer wall, the gear case 16 is provided with a large axial opening 20 that is normally closed by a detachable plate 21 secured to said case by machine screws 22, or other suitable means. The opening 20 is a slightly larger diameter than the anchored gear 18 so that the latter may be applied in working position or removed when the plate 21 is removed.

The detachable side plate 21 is formed with a hub 23 that is journaled on the projecting end of the coöperating axle extension 10. Rigidly secured to and rotating with the axle extension 10, and hence with the main axle 4, is an axial spur gear 25 that serves as the driver of the train of gears contained within the casing 16. At diametrically opposite points the gear case is provided with transversely extended spindles 26 and at other diametrically opposite points said gear case is provided with spindles 27. The spindles 26 and 27 are alike; both are extended through both walls of the casing 16; both are provided with reduced ends journaled in the inner wall of the casing 16, both are removable endwise through the outer wall of the casing when the plate 21 is removed and both with all of the said spindles 26 and 27 are held against endwise displacement by the side plate 21 when the latter is in position.

Journaled on each spindle 26 is a sleeve-like gear hub 28, formed integrally with a relatively large spur gear 29 and a relatively small pinion 30. Rotatively mounted on each spindle 27 is a sleeve-like gear hub 31 formed integrally with a relatively large spur gear 32 and a relatively small spur pinion 33. The above noted spur gears 29 meshed with the axial driving gear 25, the spur pinion 30 meshed with the respective spur gears 32 and the spur pinion 33 meshed with the anchored axial spur gear 18. With the above described arrangement of gears it is evident that there will be a very great reduction in speed and corresponding increase of power, due to the use in series of the two sets of multi-faced intermediate gears. In this statement gear 29 and pinion 30 are considered one multi-faced gear and gear 32 and pinion 33 are considered another multi-faced gear. These multi-faced gears are preferably duplicated in approximately diametrically opposite arrangement because this gives better wearing quality and evener driving action, but obviously one of the two diametrically opposite sets of gears might be dispensed with in some instances.

By this multiplex serial arrangement of the multi-faced intermediate gears, I have in practice been able to get a reduction of speed of approximately one rotation of the traction wheel for 12 rotations of the dragging axle 4, and this, too, without using gears of objectionably large size. The gears within casing 16 are, of course, adapted to run in oil.

The construction above described also makes assembling and disassembling of the elements of the wheel an easy matter. To disassemble, for example, the side plate 21 must first be removed and then after nut 8 has been removed, axle extension 10 and gear 25 may be pulled out of position. Spindles 26 and 27 may also then be moved endwise, leaving the sleeves 28 and 31 with their adapted gears free for removal through the opening 20. Then the anchored gear 18 may be detached and removed through the opening 20. Assembling the parts would be in an order reverse from that just above described.

What I claim is:

1. The combination with a vehicle axle and a bearing therefor, of a vehicle wheel journaled around said axle, said wheel having a gear casing in its hub structure and said casing having a detachable outer side plate, an anchored external gear concentric with said axle and within said casing, a plurality of multi-faced reducing gears carried within said casing and connected in a series between said driving gear and said anchored gear, and endwise removable spindles for said multi-faced gears, seated in the sides of said gear casing and normally held in working position by the detachable side plate of said gear casing.

2. The combination with a vehicle axle and a bearing therefor, of a vehicle wheel provided with a gear casing in its hub structure and the inner wall of said casing having a sleeve-like hub journaled on said bearing, and the outer wall of said casing having a detachable side plate with an axial bearing hub journaled on an extended portion of said axle, an anchored gear detachably secured to the end of said bearing and holding said wheel against axial displacement, a driving gear carried by said axle within said casing and detachable from the main portion of said axle, and reducing gears located within said casing, journaled thereto and movable therewith, and intermediately connected between said driving gear and anchored gear, the said several gears being removable from said casing through the opening normally closed by said detachable side plate.

3. The combination with a vehicle axle and a bearing therefor, of a vehicle wheel provided with a gear casing in its hub structure and the inner wall of said casing having a sleeve-like hub journaled on said bearing, and the outer wall of said casing having a detachable side plate with an axial bearing hub journaled on an extended portion of said axle, an anchored gear detachably secured to the end of said bearing and holding said wheel against axial displacement, a driving gear carried by said axle within said casing and detachable from the main portion of said axle, and reducing gears located within said casing, journaled thereto and movable therewith, and intermediately connected between said driving gear and anchored gear, the said several gears being removable from said casing through the opening normally closed by said detachable side plate and spindles on which intermediate gears are journaled, said spindles being normally held in working position by said side plate and being endwise removable when said side plate is removed.

In testimony whereof I affix my signature in presence of two witnesses.

HERBERT O. DAY.

Witnesses:
 CLARA DEMAREST,
 EVA E. KÖNIG.